US012809530B2

(12) United States Patent
Besinga et al.

(10) Patent No.: US 12,809,530 B2
(45) Date of Patent: Nov. 24, 2026

(54) EDGE BLOCK ASSIGNMENT TO SINGLE LEVEL CELL (SLC) MODE IN MEMORY DEVICES

(71) Applicant: MICRON TECHNOLOGY, INC., Boise, ID (US)

(72) Inventors: Gary F. Besinga, Boise, ID (US); Tawalin Opastrakoon, Boise, ID (US); Michael G. Miller, Boise, ID (US); Che Chen, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/047,040

(22) Filed: Feb. 6, 2025

(65) Prior Publication Data

US 2025/0278202 A1 Sep. 4, 2025

Related U.S. Application Data

(60) Provisional application No. 63/560,116, filed on Mar. 1, 2024.

(51) Int. Cl.
*G06F 3/06* (2006.01)

(52) U.S. Cl.
CPC ............ *G06F 3/0619* (2013.01); *G06F 3/064* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2010/0017650 A1 | 1/2010 | Chin et al. | |
| 2018/0358103 A1 | 12/2018 | Shur et al. | |
| 2019/0179698 A1 | 6/2019 | Liu et al. | |
| 2019/0332298 A1 | 10/2019 | Madabhushi | |
| 2023/0152995 A1 | 5/2023 | Doni et al. | |
| 2023/0402112 A1* | 12/2023 | Sharon | G11C 11/1673 |

FOREIGN PATENT DOCUMENTS

CA 2643332 A1 * 10/2007 ........... G06F 3/0643

OTHER PUBLICATIONS

International Search Report and Written Opinion for International Application No. PCT/US2025/017993, mailed Jun. 4, 2025, 10 Pages.

* cited by examiner

*Primary Examiner* — Brian R Peugh
(74) *Attorney, Agent, or Firm* — Lowenstein Sandler LLP

(57) ABSTRACT

One or more edge blocks of a die of a memory device are identified. A block assignment data structure associated with the memory device is identified. The block assignment data structure comprises a plurality of records, each record mapping one or more specific blocks of the memory device to a corresponding cell type of a plurality of cell types. The one or more identified edge blocks are assigned, by the block assignment data structure, to a single level cell (SLC) cell type.

20 Claims, 5 Drawing Sheets

| Block Assignment Table 220 | | | |
|---|---|---|---|
| Die 222 | Plane 224 | Block 226 | Data Density 228 |
| 1 | 1 | [232A] | SLC |
| 1 | 1 | [232C] | XLC |
| 1 | 1 | [232B] | SLC |
| ... | ... | ... | ... |
| M | X | [238A] | SLC |
| M | X | [238C] | XLC |
| M | X | [238B] | SLC |

EDGE BLOCK ASSIGNMENT TO SINGLE LEVEL CELL (SLC) MODE IN MEMORY DEVICES

CROSS-REFERENCE TO RELATED APPLICATION(S)

The present application claims priority to U.S. Provisional Patent Application No. 63/560,116, filed on Mar. 1, 2024 and entitled "EDGE BLOCK ASSIGNMENT TO SINGLE LEVEL CELL (SLC) MODE IN MEMORY DEVICES", the entire contents of which are hereby incorporated by reference herein.

TECHNICAL FIELD

Embodiments of the disclosure relate generally to memory sub-systems, and more specifically, relate to a system for assigning edge blocks to single level cell (SLC) mode in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
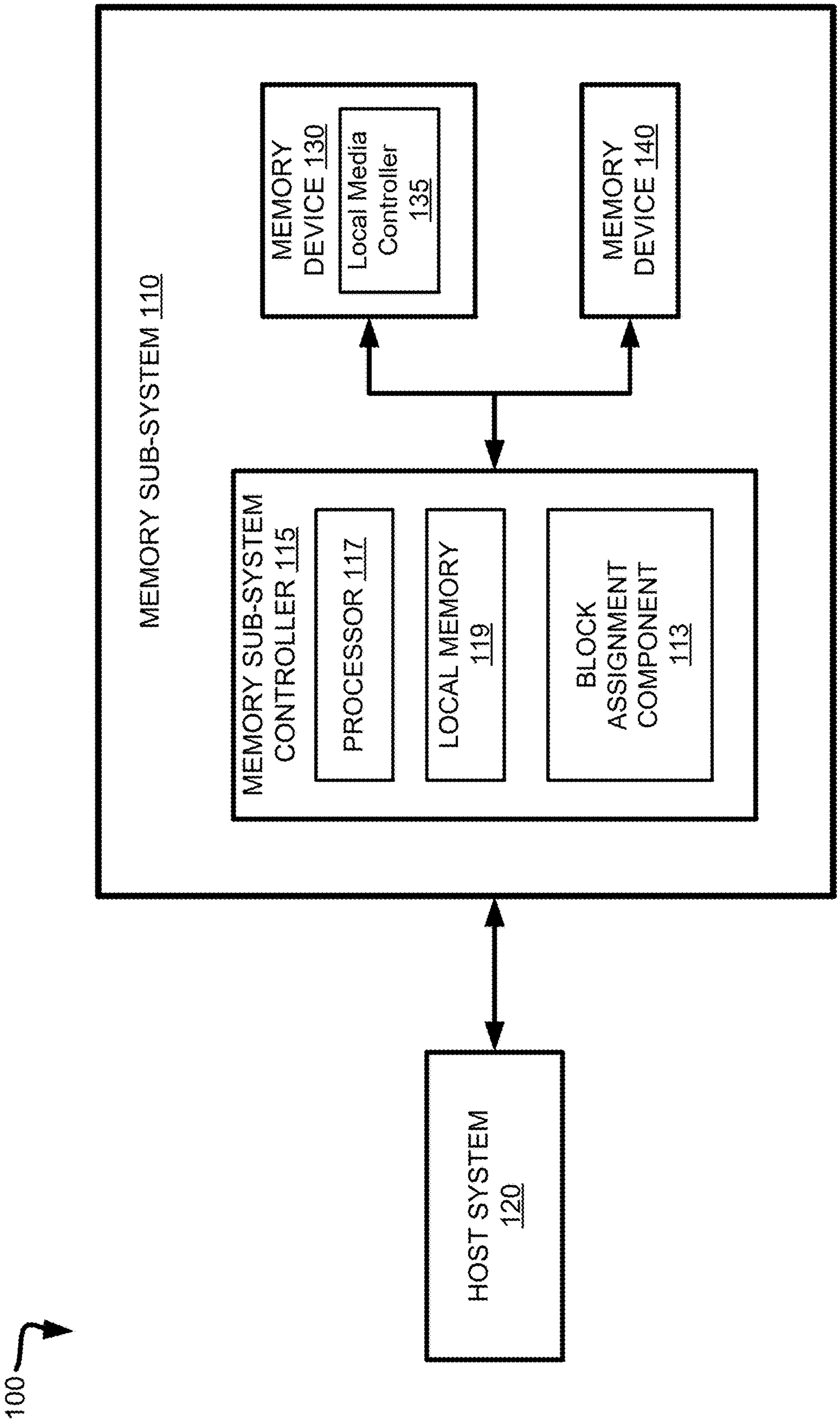
FIG. 1 illustrates an example computing system that includes a memory sub-system in accordance with some embodiments of the present disclosure.

Aspects of the present disclosure are directed to assigning edge blocks to single level cell (SLC) mode in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or a three-dimensional grid. The memory cells can be formed on a silicon wafer in an array of columns and rows. A wordline can refer to one or more conductive lines coupled to memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Memory devices can include one or more arrays of memory cells configured as single-level cell (SLC) memory, multi-level cell (MLC) memory, triple-level cell (TLC) memory, quad-level cell (QLC) memory, or penta-level cell (PLC) memory. Each type can have a different data density, which corresponds to an amount of data (e.g., bits of data) that can be stored per memory cell of a memory device. A single-level cell can store one bit of data, a multi-level cell can store two bits of data, a triple-level cell can store three bits of data, and so on. Accordingly, a memory device including TLC memory cells will have a higher data density than a memory device including SLC memory cells. Additionally, each type of memory cell can have different endurance for storing data. The endurance of the memory device is the number of write operations or a number of program/erase operations performed on a memory cell of the memory device before data can no longer be reliably stored at the memory cell. For example, SLC memory cells that have a lower data density can have higher endurance threshold than TLC memory cells that have a higher data density. In some instances, SLC memory cells can have an endurance threshold in the range of 3 to 40 times higher than that of TLC memory cells. Accordingly, SLC memory cells can store less total data, but can be used for longer periods of time while TLC memory cells can store more total data, but can be used for shorter periods of time.

Additionally, each type of memory cell can have a different intrinsic error rate. A memory cell can be programmed (written to) by applying a certain voltage of the memory cell, which results in an electric charge being held by the memory cell, thus allowing modulation of the voltage distributions produced by the memory cell. Precisely controlling the amount of the electric charge stored by the memory cell allows the establishment of multiple threshold voltage levels corresponding to different logical levels, thus effectively allowing a single memory cell to store multiple bits of information. For example, a memory cell operated with 2n different threshold voltage levels is capable of storing n bits of information. Thus, the read operation can be performed by comparing the measured voltage exhibited by the memory cell to one or more reference read voltage levels in order to distinguish between two logical levels for SLC cells and between multiple logical levels for multi-level cells (e.g., MLC, TLC, etc.). Since SLC cells store only one bit of data, they are less likely to encounter errors.

Because of the lower error rate and higher endurance of SLC memory cells, certain system data structures can be stored on SLC memory cells to ensure data reliability. Examples of SLC-resident system data structures can include a flash translation layer (FTL) table or a forced or static SLC cache. Certain non-volatile memory devices use a flash translation layer to translate logical addresses of memory access requests to corresponding physical memory addresses. The mapping of logical addresses to physical addresses is stored in an FTL table. Forced SLC caching utilizes SLC cache to indirectly write data received from a host system to XLC storage. An XLC cell is a multiple level cell that stores more than one bit of data per cell (e.g., MLC, TLC, QLC, or PLC). A static SLC cache is a fixed portion of SLC cache. Data written to the SLC cache can later be moved, asynchronously with respect to writing operations, from SLC cache to XLC storage to make room for future writes to the SLC cache (e.g., 1 bit in SLC cache can take up the same space as 4 bits in QLC storage). For example, the data can be moved in the background or during idle times to maintain performance. To help ensure reliability and endurance, both SLC cache and FTL tables can be stored on SLC memory cells.

A memory sub-system controller can assign a fixed list of blocks to store FTL tables and/or forced or static SLC cache. For example, a memory sub-system controller can assign the first eight logical blocks of a die to store FTL tables and/or forced or static SLC cache. An example of SLC-resident system data is a firmware image. The firmware image contains specific set of instructions designed to be loaded onto and executed by the memory sub-system controller. Since the latency of access of the firmware image can be crucial to performance of the memory sub-system, it can benefit from the low error rate and high durability of SLC memory.

Blocks of memory device can exhibit varying degrees of error rates. One factor that can affect the error rates of a block is the physical location of the block. For instance, edge blocks have a higher error rate than blocks that non-edge blocks. An edge block is one that is physically located at or near the edge of a plane of a die of a memory device. Edge blocks can have a higher error rate than non-edge blocks due to the lithography process used during manufacturing of a memory device, which can change when the reaching the edge of a structure. Edge blocks can also be affected by a higher threshold voltage shift than non-edge blocks. Cell-to-cell interference, which occurs when programming one memory cell causes its neighbor cell's threshold voltage to shift, can affect the threshold voltage of a memory cell. When a cell's neighboring cell is not programmed, the threshold voltage of the programmed cell can shift more quickly than the threshold voltage of a cell that has a programmed memory cell on either side. The programmed neighboring memory cells can provide a counter pulse to the inner memory cell, thus slowing the lateral voltage shift. Thus, edge blocks that do not have a programmed neighboring memory cell can have a higher error rate than non-edge blocks.

Failure by a memory to take into account the block physical location when identifying blocks on which to store data may result in assigning blocks that have an intrinsically higher error rate than other blocks (e.g., edge blocks) to a memory cell type that has a higher error rate (e.g., MLC, TLC, QLC, PLC), while blocks that have an intrinsically lower error rate (e.g., non-edge blocks) can be assigned to a memory cell type that has a lower error rate (e.g., SLC).

Aspects of the present disclosure address the above-noted and other deficiencies by assigning edge blocks to the SLC cell type, thus offsetting the intrinsically higher error rates of edge blocks with the lower error rates of SLC type memory cells. In some implementations, a memory sub-system controller can maintain and/or update a block assignment data structure. The block assignment data structure can assign blocks of a die to be configured to certain memory cell type(s), such as SLC, MLC, TLC, QLC, or PLC, and/or a combination of memory cell types. A block capable of being configured as QLC can be configured with memory cells of lower data density, such as SLC, MLC, or TLC. Similarly, a block capable of being configured as TLC can be configured with memory cells of a lower data density such as SLC or MLC.

In some embodiments, a memory sub-system controller can identify edge blocks of a memory die of a particular memory device. The memory sub-system controller can identify the edge blocks by block number. In some embodiments, the memory sub-system controller can identify a data structure that corresponds to the particular memory device (e.g., either corresponds directly to the particular memory device, or corresponds to all memory devices of the same type as the particular memory device). The data structure can list the blocks of the planes of the particular memory device (e.g., by block number or block identifier), and can indicate which blocks are identified as edge blocks. In some embodiments, the memory sub-system controller can identify a data structure that is stored on the memory device itself. In some embodiments, the data structure can indicate which blocks are edge blocks using descriptive parameters, such as the first block and last block of each plane are edge blocks. The memory sub-system controller can assign the identified edge blocks as SLC type in the block assignment data structure. Then, when the memory sub-system controller identifies a command (e.g., a write command) corresponding to an SLC-resident data structure, the memory sub-system controller can identify an edge block from the block assignment data structure, and can execute the command on the identified edge block. The edge block identified from the block assignment data structure is one that the memory sub-system controller previously assigned as SLC. In some embodiments, the memory sub-system controller can assign the identified edge blocks to certain SLC-resident data structures, such as FTL tables, SLC cache, or a firmware image. The memory sub-system controller can store the SLC-resident data structures on the identified edge blocks.

Advantages of the present disclosure include, but are not limited to, a lower trigger rate and reduced performance degradation. The trigger rate is the number of codewords that are not correctable when read outside of error handling. Thus, by assigning edge blocks to be used in SLC-mode, the likelihood that the raw bit error rate of the edge blocks would exceed the hard decode capability is reduced. The intrinsic high error rate of edge blocks is offset by the low error rates of SLC memory cells, thus resulting in an overall lower trigger rate. The overall lower trigger rate can help reduce negative performance impact during operation of the memory sub-system. Thus, a lower trigger rate means fewer latency-inducing error recovery operations, which results in an improved overall runtime performance of the memory sub-system is improved.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a block assignment component 113 that can assign edge blocks to SLC memory type. In some embodiments, the memory sub-system controller 115 includes at least a portion of the block assignment component 113. In some embodiments, the block assignment component 113 is part of the host system 120, an application, or an operating system. In other embodiments, local media controller 135 includes at least a portion of block assignment component 113 and is configured to perform the functionality described herein.

In some embodiments, the block assignment component 113 can maintain a block assignment data structure. The block assignment data structure can assign blocks to a cell type, such as SLC, MLC, TLC, QLC, etc. The block assignment data structure can be a table, a linked list, an array, or another kind of data structure capable of storing and organizing data. The block assignment data structure can store an address of a block, and the corresponding write mode of the block. The address can be a physical address of the block and/or a logical address of the block. The write mode of the block can refer to a mode that provides a high data density (e.g., MLC, TLC, QLC, etc.), or a mode that provides that a low data density (e.g., SLC). That is, the mode can refer to the cell type of the memory cells in the corresponding block referenced by the address in the block assignment data structure. An example block assignment data structure is described with respect to FIG. 2.

In some embodiments, upon a power-on event, the block assignment component 113 can identify, by respective block numbers, edge blocks of a die of a memory device 130. In an illustrative example, a die can have 4 planes, and each plane can have 512 blocks, numbered 1 through 512. The block assignment component 113 can identify a block on each edge of the plane as edge blocks. In some embodiments, the block assignment component 113 can identify blocks 1 and 512 as edge blocks.

In some embodiments, the block assignment data structure can assign the first x number of block(s) as dummy blocks, and/or the last y number of block(s) as dummy blocks (where x and y are integers greater than or equal to 0). A dummy block can be a block that is not used to store data. In such instances, the block assignment component 113 can identify the block immediately adjacent to the x dummy block(s) and the block immediately adjacent to the y dummy block(s) as edge blocks.

In some embodiments, the block assignment component 113 can identify a data structure that defines the edge block(s) by block number and/or block address. For example, the data structure can specify that blocks 2 and 511 are to be identified as edge blocks, or that blocks 2-4 and 509-511 are to be identified as edge blocks. In some embodiments, the data structure may specify the edge blocks using descriptive parameters. For example, the data structure can specify that the first block and last block of each plane of the memory device are to be identified as edge blocks, or that the third block and the third-to-last block of each plane of the memory device are to be identified as edge blocks. The data structure can correspond to a specific memory device (e.g., memory device 130), and/or to a type of specific memory device. In some embodiments, the data structure can be programmed into the metadata area of the memory system during manufacturing and/or characterization of the memory device. The data structure can be stored in local memory 119, and can be accessed by the block assignment component 113, e.g., upon a power-on event. In some embodiments, the data structure can be stored locally on each memory device 130, and can be accessed by the block assignment component 113, e.g., upon a power-on event. In some embodiments, once the block assignment component 113 has identified edge block(s) of a memory device, the block assignment component 113 can update the block assignment data structure to assign the edge block(s) to SLC cell type. In some embodiments, the block assignment component 113 can update the block assignment data structure to assign the edge block(s) to store SLC system data, such as FTL tables, SLC cache, and/or a firmware image.

In some embodiments, the block assignment component 113 can identify an instruction corresponding to SLC-resident data structures. An SLC-resident data structure is one that is to be stored on SLC memory, such as a flash translation layer table, an SLC cache, or a firmware image. An instruction corresponding to an SLC-resident data structure can be a program command to update the SLC-resident data structure. The block assignment component 113 can identify a block in the block assignment data structure assigned to SLC cell type, and can perform the program command (e.g., by performing a program operation to store data of SLC-resident data structure) at the block identified as SLC cell type.

In some embodiments, the block assignment component 113 can identify data stored on a memory device 130. The block assignment component 113 can identify a metric or parameter value that corresponds to the data, such as an access frequency metric or an application programming interface (API) parameter value. The access frequency metric can be part of metadata for the data. The access frequency metric can indicate how often the data is accessed over a period of time. A high access frequency can indicate that the data could benefit from the low latency and high reliability of SLC memory cells. Thus, the block assignment component 113 can move the identified data to SLC memory cells if the access frequency metric value exceeds a threshold value. In some embodiments, the API parameter can be received from the host system 110, and can indicate that the associated data is to be stored on SLC memory cells. Thus, the block assignment component 113 can store (or move) the identified data on SLC memory cells.

Further details with regards to the operations of the block assignment component 113 are described below.

Figures 2A, 2B:
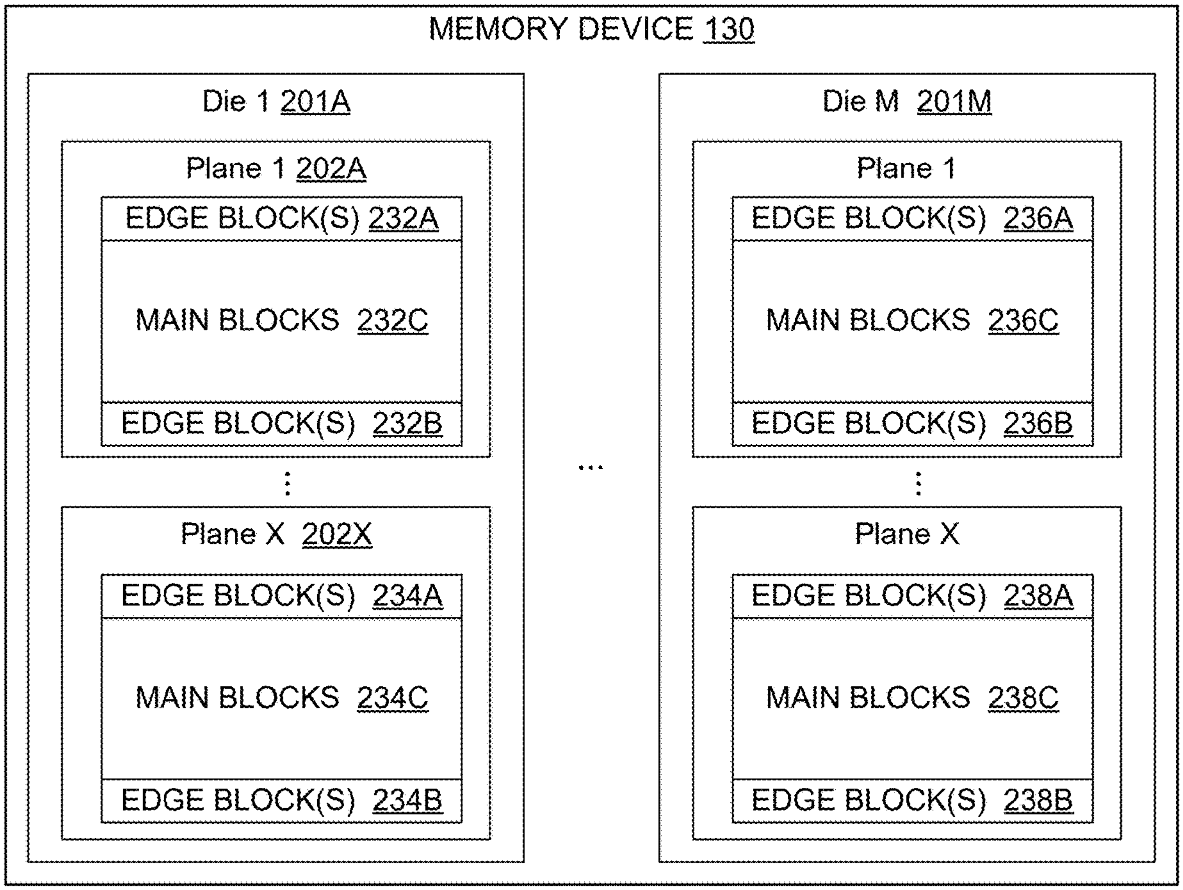
FIG. 2A illustrates an example architecture of a memory device, in accordance with some embodiments of the present disclosure.
FIG. 2B illustrates an example block assignment table, in accordance with some embodiment of the present disclosure.

FIG. 2A illustrates an example architecture of a memory device 130, in accordance with some embodiments of the present disclosure. A memory device 130 can include a number of dies, illustrated as die 1 201A-die M 201M. Each die can include a number of planes, e.g., illustrated as plane 1 202A-plane X 202B. Each plane can include a set of blocks. As illustrated in FIG. 2B, plane 1 202A can include edge block(s) 232A,232B, and main blocks 232C.

FIG. 2B illustrates an example block assignment table 220, in accordance with some embodiments of the present disclosure. In some embodiments, the block assignment component 113 generates and/or maintains the block assignment table 220. The block assignment table 220 can map blocks to a corresponding mode. The mode can represent the data density (e.g., the number of logical programming levels supported by the memory cells) of the corresponding block. A write mode can provide a high data density, such as MLC, TLC, QLC, PLC, etc., or can provide a low data density, such as SLC. An XLC cell is a multiple level cell that stores more than one bit of state information per cell (e.g., MLC, TLC, QLC, PLC, etc.).

In some embodiments, the block assignment table 220 can store an identifier of each block in memory device 130. In some embodiments, the block assignment table 220 can store a range of addresses corresponding to a range of blocks (e.g., main blocks 232C). Each block, or range of blocks, can have a corresponding mode (or data density).

As an illustrative example, the block identifier may include the die number 222, the plane number 224, the block number 226 of each block (or range of blocks) of a memory device 130, and/or any other data fields corresponding to the block assignment component 113. Each record in the block assignment table 220 can have a corresponding data density 228. The data density 228 can specify a data density. SLC data density assigns the corresponding block to SLC memory type, while XLC data density assigns the corresponding block to a multiple level cell cell type that stores more than one bit of state information per cell (e.g., MLC, TLC, QLC, PLC, etc.). In some embodiments, data density 228 can specify the multiple level cell cell type, such as MLC, TLC, etc. As illustrated in FIG. 2B, the edge blocks 232A, 232B, 238A, and 238B are assigned to SLC cell type.

In some embodiments, the block assignment table 220 can assign certain blocks to store specific system data. For example, block assignment table 220 can include an additional field (or alternative field to data density 228) to identify certain blocks to store system data structures, such as FTL tables, forced and/or static SLC cache, or a firmware image.

Figure 3:
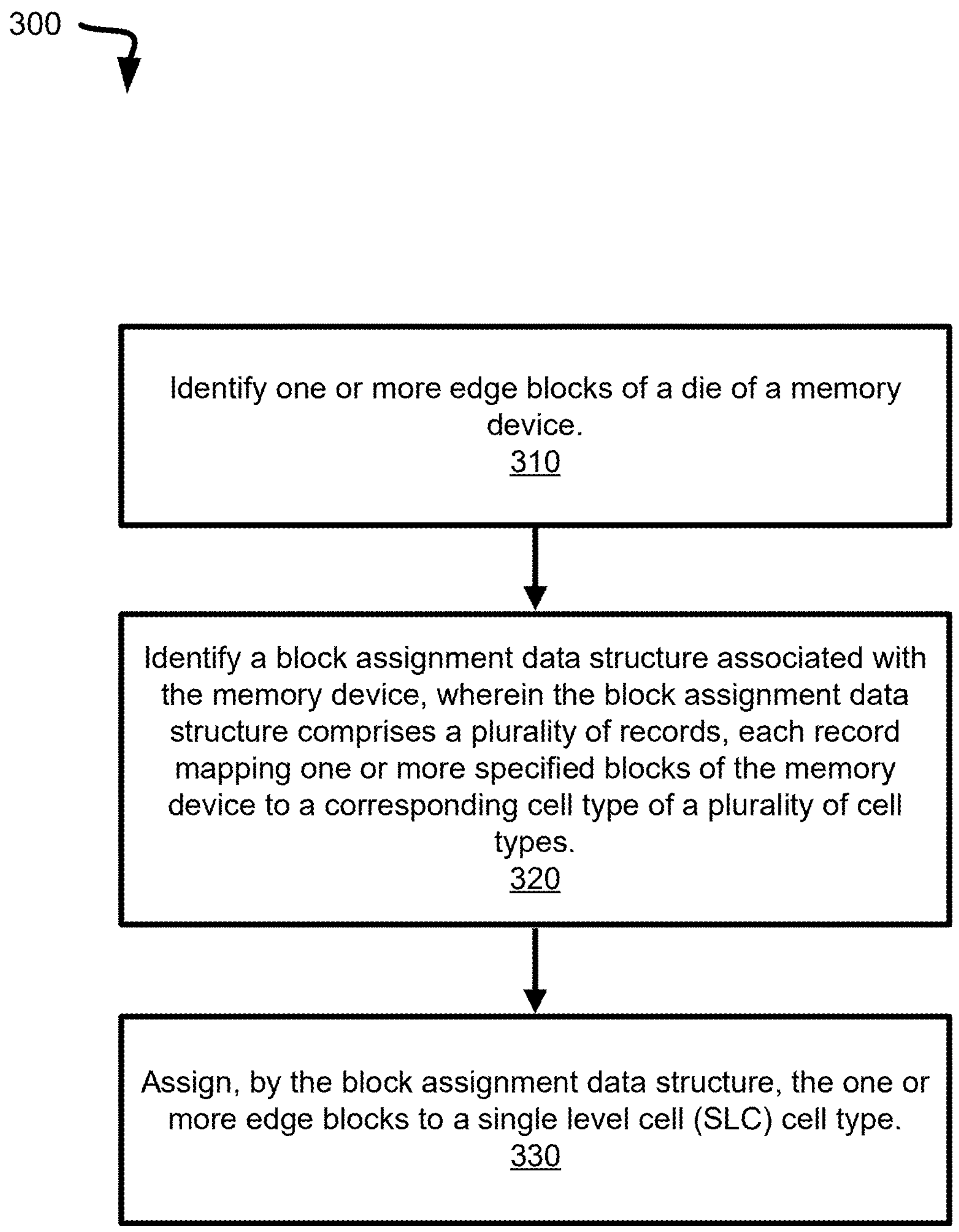
FIG. 3 is a flow diagram of an example method to assign edge blocks to single level cell cell type, in accordance with some embodiments of the present disclosure.

FIG. 3 is a flow diagram of an example method 300 to assign edge blocks to SLC cell type, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the block assignment component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic identifies one or more edge blocks of a die of a memory device (e.g., memory device 130 of FIGS. 1, 2A). In some embodiments, the processing logic identifies a plane of a memory device, and identifies a first block physically located at a first edge of the plane, and a second block physically located at a second edge of the plane. The first block and the second block are edge blocks. In some embodiments, the processing logic identifies a second data structure that corresponds to a type of the memory device. The second data structure can identify one or more edge blocks, e.g., by block number, block identifier, or block address. The processing logic can then identify the edge blocks using the second data structure.

At operation 320, the processing logic identifies a block assignment data structure (e.g., block assignment table 220 of FIG. 2B) corresponding to the memory device. The block assignment data structure assigns blocks of the memory device to a cell type of a plurality of cell types. The plurality of cell types can be SLC, MLC, TLC, QLC, PLC, and/or any other cell type. In some embodiments, the block assignment data structure assigns blocks of the memory device to multiple cell types. Thus, the block assignment data structure can include one or more records. Each record can map one more specified blocks of the memory device to a corresponding cell type of the plurality of cell types.

At operation 330, the processing logic assigns, by the block assignment data structure, the one or more identified edge blocks to a single level cell (SLC) cell type. The processing logic updates the record in the block assignment data structure corresponding to the one or more edge blocks identified at operation 310 to cell type SLC. For example, referring to FIG. 2B as an illustrative example, the processing logic can identify the record in block assignment table 220 corresponding to the identified edge block(s) (e.g., edge block(s) 232A-232B, 234A-234B, 236A-236B, or 238A-238B of memory device 130 of FIG. 2A), and update the corresponding data density field 228 to SLC.

In some embodiments, the processing logic identifies a program command associated with an SLC-resident data structure. That is, the processing logic can identify a command to program data for an SLC-resident data structure, such as an FTL table, an SLC cache, a firmware image, or another SLC-resident data structure. The processing logic can identify a block in the block assignment data structure that is assigned to the SLC cell type, and can perform the program command associated with the SLC-resident data structure on the identified block.

In some embodiments, the processing logic identifies data stored on the memory device. The data can have a corresponding access frequency metric value. The processing logic can determine whether the access frequency metric value satisfies a criterion. The criterion can be used to determine whether the corresponding should be stored on SLC-type data cells. Data with a high access frequency metric can benefit from the high endurance and low latency of SLC memory cells. Thus, the criterion can be satisfied if the access frequency metric value is above a threshold value. In response to determining that the access frequency metric value satisfies the criterion, the processing logic can identify a block in the block assignment data structure assigned to the SLC cell type, and can move the data that has the corresponding parameter satisfying the criterion to the identified block.

In some embodiments, the processing logic identifies data stored on the memory device, and the data has a corresponding application programming interface (API) parameter value. That is, the parameter value can be sent through an API that instructs the memory sub-system controller to store the corresponding data on SLC memory cells. The processing logic can determine whether the API parameter value satisfies a criterion (e.g., whether the API parameter value instructs the memory sub-system controller to store the data on SLC memory cells). In response to determining that the API parameter value satisfies the criterion, the processing logic can identify a block in the block assignment data structure assigned to the SLC cell type, and can move the data that has the corresponding parameter satisfying the criterion to the identified block.

In some embodiments, the processing logic identifies a program command directed to a memory device (e.g., memory device 130 of FIG. 1, 2A). The processing logic can identify a target block in the memory device for the program command, at which to store the data from the program command. The processing logic can identify the next available (e.g., not full) block as the target block at which to store the data. The processing logic can identify the cell type of the target block using the block assignment data structure. For example, the processing logic can determine, using the block assignment data structure, that the cell type of the target block is the SLC cell type. The processing logic can also determine the write mode of the program command. The write mode of the program command can be determined based on the type of data to be programmed. For example, the processing logic can determine an SLC write mode for programming data that corresponds to an SLC-resident data structure (e.g., FTL table, SLC cache, or firmware image). In some embodiments, the processing logic can determine an appropriate programming mode for the current conditions and requirements, to balance performance and endurance. For example, during a period of heavy write operations, the processing logic can determine to program in SLC mode to enhance performance and reduce wear on the memory cells. The data can later be moved to MLC, TLC, QLC, PLC cells when the period of heavy write operations has subsided. In response to determining that the write mode of the program command is not SLC (e.g., is MLC, TLC, QLC, PLC, etc.), the processing logic can determine to skip the target block. That is, the processing logic can determine not to store data corresponding to MLC, TLC, QLC, PLC, etc., to a block that is assigned as SLC in the block assignment data structure.

In some embodiments, the processing logic can identify a program command directed to the memory device (e.g., memory device 130 of FIGS. 1, 2A). The processing logic can determine the write mode of the program command, as described above. In response to determining that the write mode of the program command is SLC, the processing logic can identify an available target block that is assigned to the SLC cell type in the block assignment data structure. The available target block can be the next available (e.g., not full) block in the block assignment data structure. In some embodiments, the available target block can be a next available (e.g., not full) block in another data structure, such as a logical block table.

Figure 4:
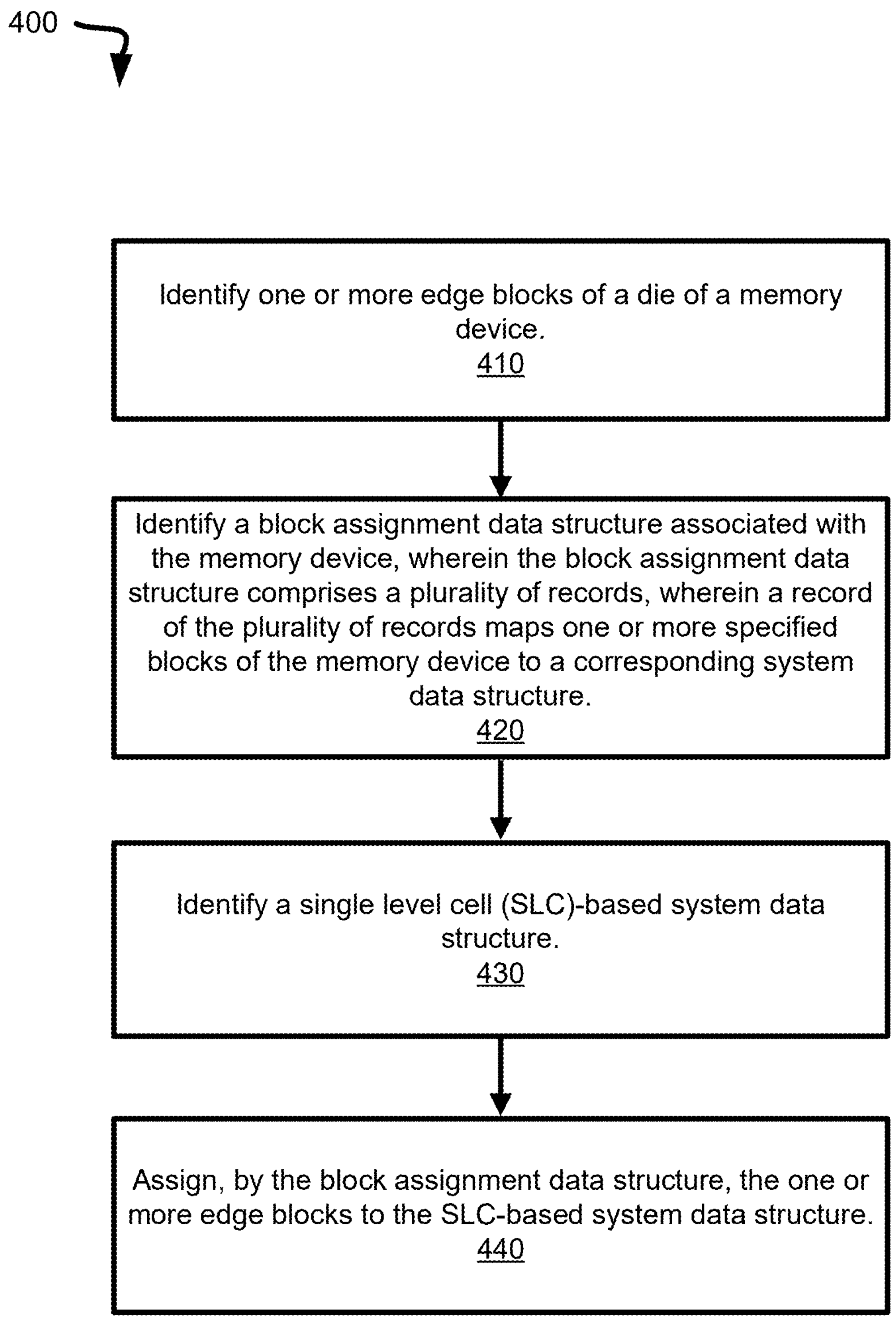
FIG. 4 is a flow diagram of an example method to assign edge blocks to SLC-resident system data, in accordance with some embodiments of the present disclosure.

FIG. 4 is a flow diagram of an example method 400 to assign edge blocks to SLC-resident system data, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the block assignment component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic identifies one or more edge blocks of a die of a memory device (e.g., memory device 130 of FIGS. 1, 2A). In some embodiments, the processing logic identifies a plane of a memory device, and identifies a first block physically located at a first edge of the plane, and a second block physically located at a second edge of the plane. The first block and the second block are edge blocks. In some embodiments, the processing logic identifies a second data structure corresponding to a type of the memory device. The second data structure can identify a one or more edge blocks, e.g., by block number, block identifier, or block address. The processing logic can then identify the edge blocks using the identified second data structure.

At operation 420, the processing logic identifies a block assignment data structure (e.g., block assignment table 220 of FIG. 2B) corresponding to the memory device. In some embodiments, the block assignment data structure assigns blocks of the memory device to system data structure. The block assignment data structure can include one or more records. Each record can include a block identifier (such as a block number or a block address, either logical or physical), and corresponding system data structure to store at the block identified by the block identifier.

In some embodiments, the block assignment data structure maps one or more blocks of the memory device to a corresponding cell type of a plurality of cell types. The plurality of cell types can be SLC, MLC, TLC, QLC, PLC, and/or any other cell type. In some embodiments, the block assignment data structure maps blocks of the memory device to multiple cell types. Thus, an entry in the block assignment data structure can include a block identifier (such as a block number or a block address, either logical or physical), and a corresponding cell type. In some embodiments, an entry in the block assignment data structure can include a range of block identifiers (e.g., edge blocks 234A of FIG. 2B), and a corresponding cell type. The processing logic can assign, by the block assignment data structure, the one or more identified edge blocks to a single level cell (SLC) cell type. The processing logic updates the record in the block assignment data structure corresponding to the one or more edge blocks identified at operation 310 to cell type SLC.

At operation 430, the processing logic identifies a single level cell (SLC)-based system data structure. The SLC-resident system data structure can correspond to an FTL table, an SLC cache (e.g., forced and/or static SLC cache), and/or a firmware image. The processing logic can identify the SLC-resident system data using metadata of the data structure. That is, the metadata can include a data field that identifies the data as SLC-resident system data structure.

At operation 440, the processing logic assigns, by the block assignment data structure, the one or more edge blocks to the SLC-resident system data structure. The processing logic can update the record in the block assignment data structure corresponding to the one or more edge blocks identified at operation 410 to the identified SLC-resident system data structure.

In some embodiments, the processing logic identifies a program command associated with the SLC-resident system data structure, such as a write command. That is, the processing logic can identify a command to program data for an SLC-resident data structure, such as an FTL table, an SLC cache, a firmware image, or another SLC-resident data structure. The processing logic identifies a block in the block assignment data structure that is assigned to the SLC-resident system data structure, and performs the program command on the identified block.

Figure 5:
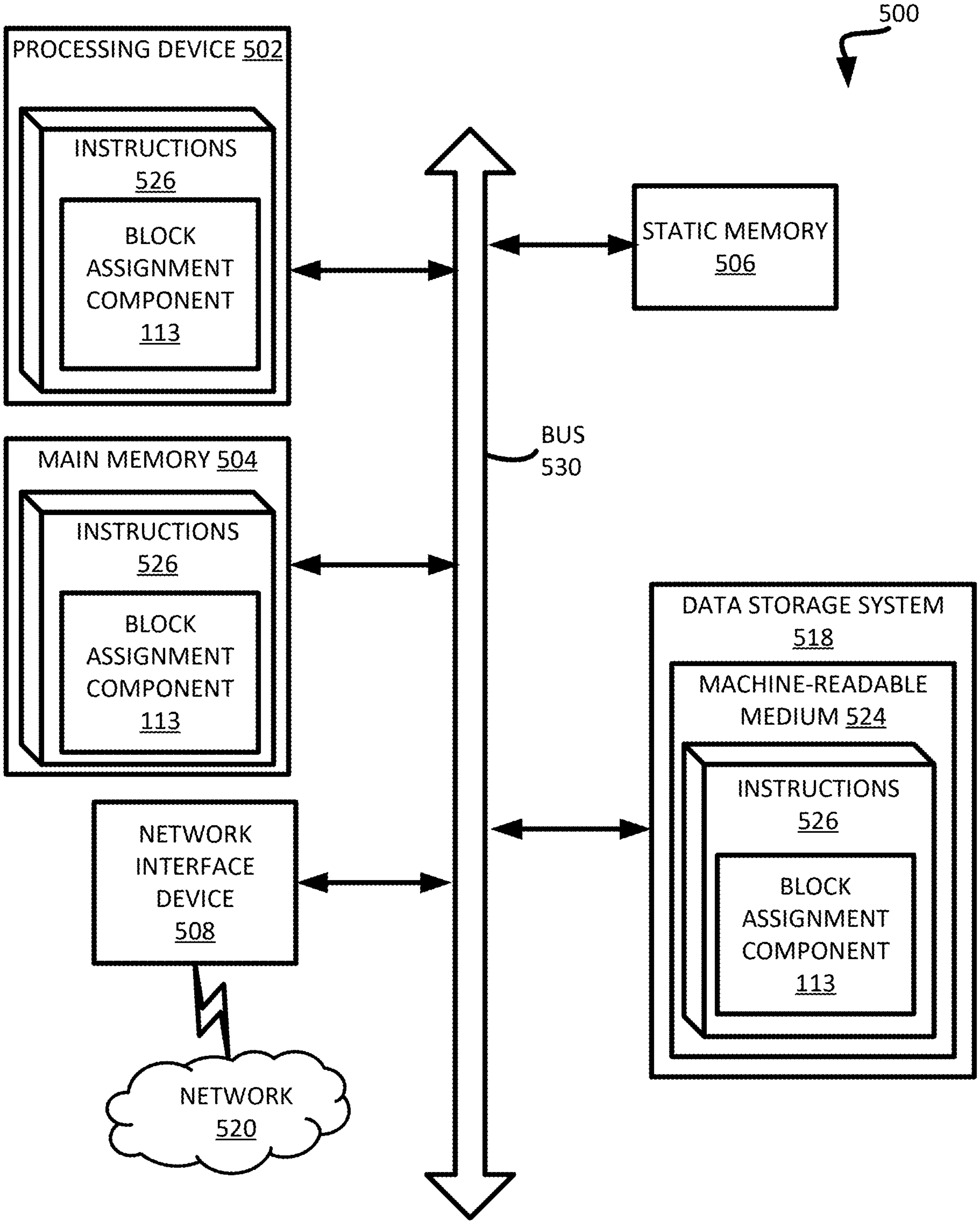
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the block assignment component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a block assignment component (e.g., the block assignment component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

identifying a first data structure associated with the memory device, wherein the first data structure identifies a subset of blocks of the memory device as edge blocks of the memory device;

identifying, using the first data structure, one or more edge blocks of a die of the memory device;

identifying a block assignment data structure associated with the memory device, wherein the block assignment data structure comprises a plurality of records, each record mapping one or more specified blocks of the memory device to a corresponding cell type of a plurality of cell types; and assigning, by the block assignment data structure, the one or more edge blocks to a single-level cell (SLC) cell type.

2. The system of claim 1, wherein the operations further comprise:

identifying a program command associated with an SLC-resident data structure;

identifying a block in the block assignment data structure, wherein the block is assigned to the SLC cell type; and performing the program command on the identified block.

3. The system of claim 2, wherein the SLC-resident data structure comprises one of a flash translation layer table, an SLC cache, or a firmware image.

4. The system of claim 1, wherein identifying the one or more edge blocks comprises:

identifying a plane of the memory device; and identifying a first block physically located at a first edge of the plane, and a second block physically located at a second edge of the plane, wherein the first data structure identifies the first block and the second block as edge blocks.

5. The system of claim 1, wherein the operations further comprise:

identifying data stored on the memory device, wherein the data is associated with an access frequency metric value;

responsive to determining that the access frequency metric value satisfies a criterion, identifying a block in the block assignment data structure that is assigned to the SLC cell type; and moving the data to the identified block.

6. The system of claim 1, wherein the operations further comprise:

responsive to identifying a program command directed to the memory device, identifying a target block for the program command;

identifying, by the block assignment data structure, the cell type of the target block;

determining that the cell type of the target block is the SLC cell type; and responsive to determining that a write mode of the program command is not SLC, determining to skip the target block.

7. The system of claim 1, wherein the operations further comprise:

identifying a program command directed to the memory device; and responsive to determining that a write mode of the program command is SLC, identifying an available target block in the block assignment data structure, wherein the available target block is assigned to the SLC cell type.

8. A non-transitory computer-readable storage medium comprising instructions that, when executed by a processing device, cause the processing device to perform operations comprising:

identifying a first data structure associated with a memory device, wherein the first data structure identifies a subset of blocks of the memory device as edge blocks of the memory device;

identifying, using the first data structure, one or more edge blocks of a die of the memory device;

identifying a block assignment data structure associated with the memory device, wherein the block assignment data structure comprises a plurality of records, wherein a record of the plurality of records assigns one or more specified blocks of the memory device to a corresponding system data structure;

identifying a single level cell (SLC)-resident system data structure; and assigning, by the block assignment data structure, the one or more edge blocks to the SLC-resident system data structure.

9. The non-transitory computer-readable storage medium of claim 8, wherein the processing device is to perform operations further comprising:

identifying a program command associated with the SLC-resident system data structure;

identifying a block in the block assignment data structure, wherein the block is assigned to the SLC-resident system data structure; and performing the program command on the identified block.

10. The non-transitory computer-readable storage medium of claim 9, wherein the SLC-resident system data structure comprises one of a flash translation layer table, an SLC cache, or a firmware image.

11. The non-transitory computer-readable storage medium of claim 8, wherein identifying the one or more edge blocks comprises:

identifying a plane of the memory device; and identifying a first block physically located at a first edge of the plane, and a second block physically located at a second edge of the plane.

12. The non-transitory computer-readable storage medium of claim 8, wherein a second record of the plurality of records maps one or more second blocks of the memory device to a corresponding cell type of a plurality of cell types, and wherein the processing device is to perform operations further comprising:

assigning, by the block assignment data structure, the one or more edge blocks to a single level cell (SLC) cell type.

13. A method comprising:

identifying a first data structure associated with a memory device, wherein the first data structure identifies a subset of blocks of the memory device as edge blocks of the memory device;

identifying, using the first data structure, one or more edge blocks of a die of a memory device;

identifying a block assignment data structure associated with the memory device, wherein the block assignment data structure comprises a plurality of records, each record mapping one or more specified blocks of the memory device to a corresponding cell type of a plurality of cell types; and assigning, by the block assignment data structure, the one or more edge blocks to a single-level cell (SLC) cell type.

14. The method of claim 13, further comprising:

identifying a program command associated with an SLC-resident data structure;

identifying a block in the block assignment data structure, wherein the block is assigned to the SLC cell type; and performing the program command on the identified block.

15. The method of claim 14, wherein the SLC-resident data structure comprises one of a flash translation layer table, an SLC cache, or a firmware image.

16. The method of claim 13, wherein identifying the one or more edge blocks comprises:

identifying a plane of the memory device; and identifying a first block physically located at a first edge of the plane, and a second block physically located at a second edge of the plane, wherein the first data structure identifies the first block and the second block as edge blocks.

17. The method of claim 13, further comprising:

identifying data stored on the memory device, wherein the data is associated with an application programming interface (API) parameter value;

responsive to determining that the API parameter value satisfies a criterion, identifying a block in the block assignment data structure assigned to the SLC cell type; and moving the data to the identified block.

18. The method of claim 13, further comprising:

responsive to identifying a program command directed to the memory device, identifying a target block for the program command;

identifying, by the block assignment data structure, the cell type of the target block;

determining that the cell type of the target block is the SLC cell type; and responsive to determining that a write mode of the program command is not SLC, determining to skip the target block.

19. The method of claim 13, further comprising:

identifying a program command directed to the memory device; and responsive to determining that a write mode of the program command is SLC, identifying an available target block in the block assignment data structure, wherein the available target block is assigned to the SLC cell type.

20. The method of claim 13, further comprising:

identifying, using the block assignment data structure, a block assigned as a dummy block of the die of the memory device;

identifying a block adjacent to the block assigned as the dummy block; and updating the first data structure to indicate that the block adjacent to the block assigned as the dummy block is an edge block.

* * * * *